United States Patent [19]

Oguri

[11] Patent Number: 4,894,517

[45] Date of Patent: Jan. 16, 1990

[54] SHRINKING APPARATUS

[75] Inventor: Masanori Oguri, Nara, Japan

[73] Assignees: Sekisui Kaseihin Kogyo Kabushiki Kaisha, Nara; Hoton Ceramics Kabushiki Kaisha, Kanazawa; Nichido Sangyo Kabushiki Kaisha, Tokyo, all of Japan

[21] Appl. No.: 221,142

[22] Filed: Jul. 19, 1988

[30] Foreign Application Priority Data

Jul. 20, 1987 [JP] Japan .................................. 62-180628

[51] Int. Cl.4 .......................... F27B 9/06; F27D 11/00
[52] U.S. Cl. .................................... 219/388; 219/343; 219/405; 219/411
[58] Field of Search ............... 219/388, 343, 345, 405, 219/411, 390, 216; 34/4, 13, 17, 236

[56] References Cited

U.S. PATENT DOCUMENTS

| 784,854 | 3/1905 | Grace | 219/388 |
|---|---|---|---|
| 1,447,494 | 3/1923 | Strown | 34/236 |
| 2,529,704 | 11/1950 | Olsen | 34/4 |
| 3,000,141 | 9/1961 | Gregorius | 219/388 |
| 4,169,007 | 9/1979 | Pray | 219/343 |
| 4,486,172 | 12/1984 | Dunning | 219/388 |
| 4,501,072 | 2/1985 | Jacobi | 219/388 |
| 4,684,784 | 8/1987 | Tamary | 219/216 |

Primary Examiner—Teresa J. Walberg
Attorney, Agent, or Firm—Armstrong, Nikaido, Marmelstein, Kubovcik & Murray

[57] ABSTRACT

Shrinking apparatus for heating and shrinking articles such as disused molded articles of thermoplastic expanded resin by a plurality of far-infrared heaters, thereby to reduce the articles in bulk. In the shrinking apparatus, the distances between article conveying device and the far-infrared heaters opposite thereto are gradually reduced in a direction from the furnace inlet to the furnace outlet such that the far infrared rays are efficiently irradiated onto the articles of which entire height is gradually lowered.

10 Claims, 5 Drawing Sheets

SHRINKING APPARATUS

BACKGROUND OF THE INVENTION

The present invention relates to a shrinking apparatus, and more particularly to a shrinking apparatus for heating and melting molded articles of thermoplastic resin such as expanded polystyrene or other thermoplastic disused articles by far-infrared rays, causing the same to be so reduced in bulk as to be handled with ease.

Molded articles of thermoplastic resin such as expanded polystyrene have the advantages of lightweight, excellent adiabatic and cushioning properties, and the like. Accordingly, such molded articles have been widely used as a variety of packing materials and containers instead of corrugated cardboard materials and wooden boxes.

After use, the molded articles of thermoplastic resin are scrapped or collected for reuse. However, bulky molded articles of thermoplastic resin as they are, not only cause inconvenience in transit, handling and the like, but also require expensive handling costs.

It is therefore required to minimize such molded articles in volume. Thus, there has been proposed a shrinking apparatus in which, while articles or expanded polystyrene molded articles are conveyed by conveying means such as a belt conveyor, far-infrared heaters opposite to the conveying means in a furnace heat and shrink the articles, causing the same to be reduced in bulk (See, for example, Japanese Publication for Unexamined Patent Application No. 81440/1986 and No. 104708/1987).

When far infrared rays are irradiated onto the articles, the articles are shrunk during the conveyance thereof and the max. height (entire height) thereof varies. In the conventional shrinking apparatus abovementioned, the far-infrared heaters can be vertically slided in their entirety according to the entire height of the articles prior to the treatment. However, provision is made such that the distance between the conveying means and the far-infrared heaters is constant in the conveying direction. Accordingly, as the bulk of the articles becomes smaller, the distance between the articles and the far-infrared heaters becomes greater. This fails to efficiently irradiate the far infrared rays to the articles. Thus, the conventional shrinking apparatus fails to achieve an efficient bulk reduction, thereby to lower the treatment capacity.

OBJECT AND SUMMARY OF THE INVENTION

It is an object of the present invention to provide a shrinking apparatus for efficiently reducing the bulk of molded articles of thermoplastic expanded resin and the like.

In order to achieve the object above-mentioned, the shrinking apparatus in accordance with the present invention is arranged such that the distances between the conveying means and the far-infrared heaters opposite thereto are gradually reduced in a direction from the inlet of a furnace to the outlet thereof.

To reduce the distances between the far-infrared heaters and the conveying means in a direction from the furnace inlet to the furnace outlet, the shrinking apparatus may be arranged such that the levels of the far-infrared heaters are gradually lowered in a direction from the furnace inlet to the furnace outlet with the level of the conveying surface of the article conveying means where articles are placed, maintained substantially at an equal level, or such that the level of the conveying surface of the article conveying means is gradually raised in a direction from the furnace inlet to the furnace outlet with the far-infrared heaters disposed substantially at the same level.

In accordance with the present invention, the conveying means may be a belt conveyor having a conveyor belt whose at least conveying surface coming in contact with articles is preferably made of fluororesin. The conveyor belt is also made of polytetrafluoroethylene reinforced by glass fibers.

In accordance with the present invention, the shrinking apparatus may be additionally provided with far-infrared heaters for heating articles from the lateral sides thereof.

The object of the present invention will be apparent from the following detailed description with reference to the attached drawings.

DETAILED DESCRIPTION OF THE PREFERRED EMBODIMENTS

The following description will discuss in more detail the present invention with reference to the attached drawings showing preferred embodiments thereof.

Figure 1:
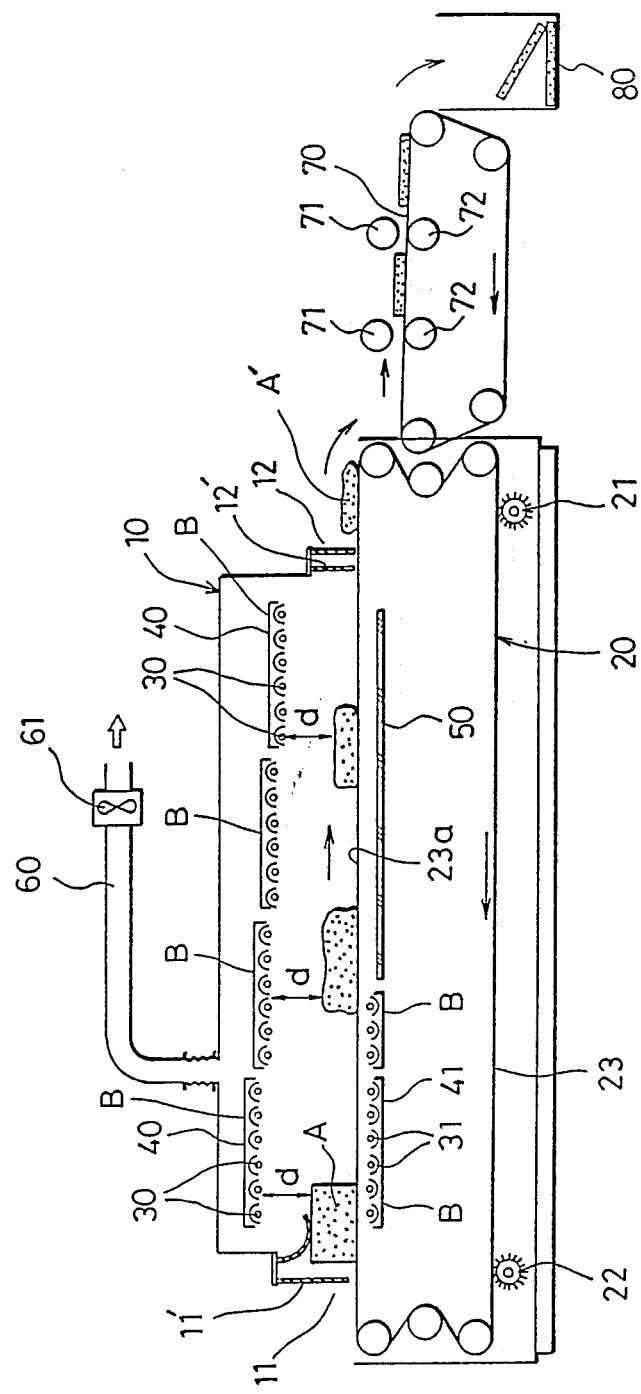
FIG. 1 is a schematic front view of a shrinking apparatus in accordance with a first embodiment of the present invention.

As shown in FIG. 1, the shrinking apparatus in accordance with the present invention has a main portion including a furnace 10 using far-infrared heaters as a heating source, and a belt conveyor 20 as conveying means for conveying an article A such as a molded article of expanded polystyrene or other thermoplastic expanded resin, from a furnace inlet 11 to a furnace outlet 12.

Disposed above the belt conveyor 20 are first far-infrared heaters 30 formed by ceramic heaters or the like which radiate far-infrared rays having a predetermined wavelength (normally from 3 to 13 $\mu$m). A plurality of such far-infrared heaters 30 are disposed in both directions, i.e., the article conveying direction and the direction at right angle thereto, respectively. The first far-infrared heaters 30 are disposed as partitioned in a plurality of blocks B along the article conveying direction. A reflector 40 in the form of a lamp shade is disposed in each block B. A plurality of second far-infrared heaters 31 for heating the article A from the bottom thereof are disposed in the vicinity of the furnace inlet 11 which forms a preheating zone, under the upper side 23a of a conveyor belt 23 of the belt conveyor 20, which conveys the article (hereinafter referred to as the conveying-side belt 23a). The second far-infrared heaters 31 are formed by ceramic heaters similar to those of the first far-infrared heaters 30, and are disposed as partitioned in a plurality of blocks B along the article conveying direction. A reflector 41 in the form of a lamp shade is disposed in each block B. The far-infrared heaters 30 and 31 can be adjusted in level for each of the blocks B by known mechanisms.

A reflector 50 made of an aluminium plate or the like is disposed downstream of and adjacently to the second far-infrared heaters 31 under the conveying-side belt 23a. This reflector 50 reflects the far infrared rays irradiated by the first far-infrared heaters 30, thus improving the irradiation efficiency of the far infrared rays onto the article A.

The conveyor belt 23 of the belt conveyor 20 is made of a metallic net. The use of the conveyor belt 23 made of a metallic net restrains the article A from sticking to the conveyor belt 23. Further, highly efficient transmission of the far infrared rays through the meshes of the metallic net enhances the reflection efficiency of the reflector 50.

Cleaner brushes 21, 22 are disposed along the conveyor belt 23 at predetermined positions thereof. If the article A partially sticks to and remains on the conveyor belt 23, these cleaner brushes 21, 22 scrape off such residual portions on the conveyor belt 23.

Double curtains 11', 12' are respectively disposed at the inlet 11 and the outlet 12 of the furnace 10. The provision of these double curtains 11', 12' prevents the temperature in the furnace 10 from being influenced by the external temperature.

An exhaust duct 60 disposed on the furnace 10 is provided at a mid-portion thereof with a blower fan 61 for forcibly discharging an offensive smell, gas or the like in the furnace 10.

The shrinking apparatus above-mentioned is further provided with a belt conveyor 70 for conveying an article A' which has been shrunk as reduced in bulk and conveyed to the outside of the furnace 10. Disposed at mid-portions of the belt conveyor 70 are a plurality of compression rolls 71, 72 for further compressing the article A'. A collecting member 80 for collecting the article A' is disposed downstream of and adjacently to the belt conveyor 70. Alternatively, the belt conveyor 70 may be omitted and the collecting member 80 may be disposed immediately after the furnace 10.

Figure 2:
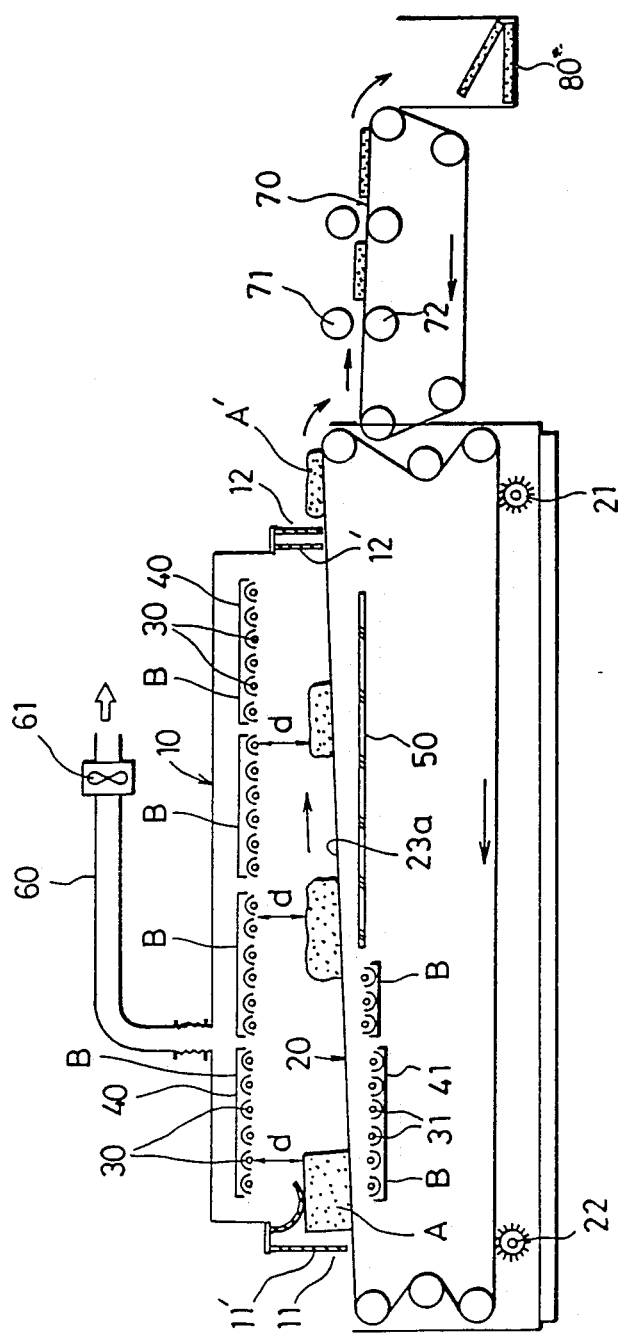
FIG. 2 is a schematic front view of a shrinking apparatus in accordance with a second embodiment of the present invention.

In the shrinking apparatus above-mentioned, the first far-infrared heaters 30 are arranged such that the distances between the conveying-side belt 23a of the belt conveyor 20 and the first far-infrared heaters 30 opposite thereto are gradually reduced in a direction from the furnace inlet 11 to the furnace outlet 12. More specifically, the conveying-side belt 23a is positioned substantially at an equal level, and the levels of the first far-infrared heaters 30 in the respective blocks B are gradually lowered in a direction from the furnace inlet 11 to the furnace outlet 12 such that the distance d between the first far-infrared heaters 30 and the article A of which entire height is lowered as the article A is conveyed from the furnace inlet 11 toward the furnace outlet 12, is maintained substantially in a predetermined range. Alternatively, as shown in FIG. 2 the first far-infrared heaters 30 are positioned substantially at the same level, and the conveying-side belt 23a may be arranged such that the level thereof is gradually raised in a direction from the furnace inlet 11 to the furnace outlet 12.

With the arrangement above-mentioned, it is possible to maintain the distance d between the first far-infrared heaters 30 and the article A of which entire height is gradually reduced during passage in the furnace, substantially in a predetermined range throughout the furnace 10 from the inlet 11 to the outlet 12. This assures efficient irradiation of the far infrared rays by the first far-infrared heaters 30.

To make sure of how the distance d between the article A and the first far-infrared heaters 30 exerts an influence upon the shrinkage factor of the article A, tests were conducted under the following conditions:

(1) Test Sample (Article)

Molded article of expanded polystyrene for packing mechanical parts (density : 0.0255)

(2) Test Conditions

Heater surface temp.: 400 ±3° C.
Conveyor speed: 1.1 m/min.

(3) Test Method

Different values were provided as the distance d between the article and the first far-infrared heaters. Ten tests were conducted for each distance d and the shrinkage factor of each article was obtained according to the following equation:

$$\frac{V0 - V}{V0} \times 100$$

Where V0 : Volume before treatment
V : Volume after treatment

It is noted that the volume was measured according to a sinking method.

Figure 3:
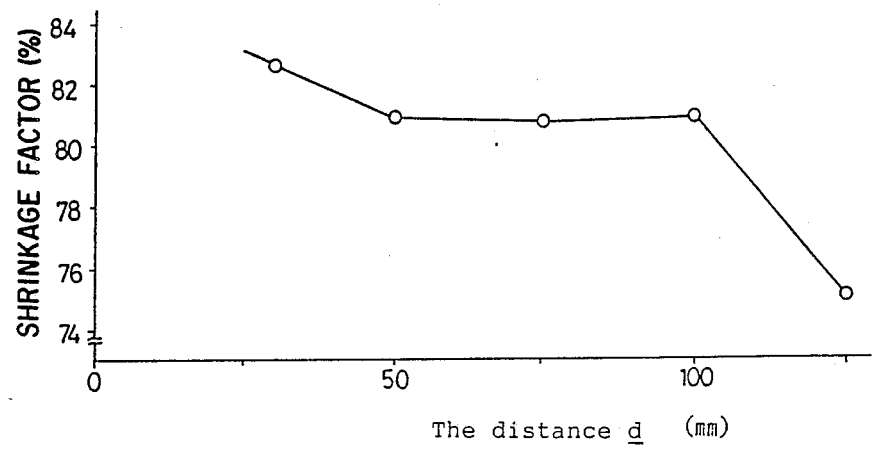
FIG. 3 is a graph showing a relationship between the shrinkage factor of an article and the distance between the article and far-infrared heaters.

The test results are shown in Table 1, of which data are graphed in FIG. 3.

TABLE 1

| Distance | 30 mm | 50 mm | 75 mm | 100 mm | 125 mm |
|---|---|---|---|---|---|
| Shrinkage Factor Test No. | | | | | |
| 1 | 85.3% | 82.7% | 82.7% | 81.2% | 79.1% |
| 2 | 82.0 | 83.5 | 83.5 | 81.9 | 77.7 |
| 3 | 82.7 | 80.1 | 80.1 | 80.6 | 74.9 |
| 4 | 85.1 | 80.9 | 81.9 | 81.4 | 77.1 |
| 5 | 81.7 | 77.0 | 80.6 | 80.1 | 74.9 |
| 6 | 79.8 | 82.4 | 81.4 | 81.4 | 73.9 |
| 7 | 81.2 | 79.1 | 80.1 | 81.7 | 73.8 |
| 8 | 83.5 | 83.0 | 79.8 | 80.9 | 75.0 |
| 9 | 82.7 | 78.0 | 78.0 | 79.1 | 70.7 |
| 10 | 81.9 | 82.4 | 79.3 | 80.9 | 73.9 |
| Average | 82.6 | 80.9 | 80.7 | 80.9 | 75.1 |
| Standard Deviation | 1.6 | 1.4 | 1.6 | 0.8 | 2.3 |

It is apparent from the test results in Table 1 that the smaller the distance d between the first far-infrared heaters and the article is, the greater the shrinkage factor is.

The following description will discuss a preferred range of the distance d between the first far-infrared heaters 30 and the article A with a concrete example taken.

Figure 4:
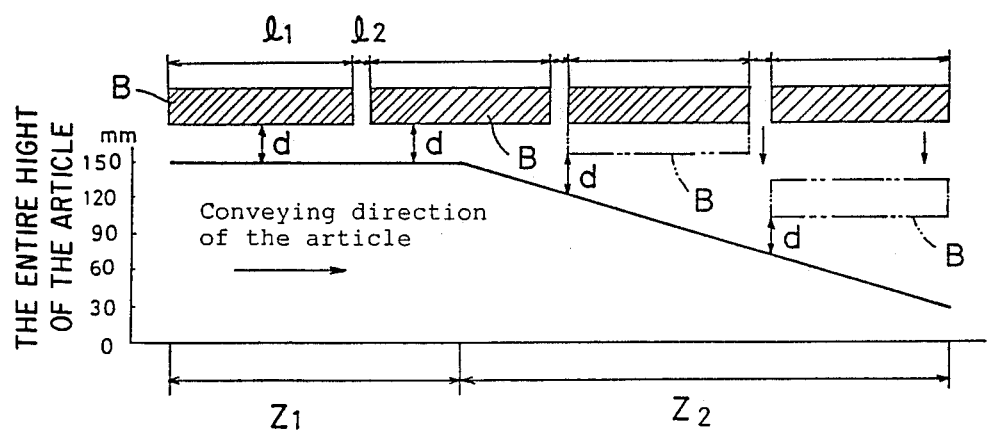
FIG. 4 is a view illustrating the actual distance between an article and the far-infrared heaters.

As shown in FIG. 4, the first far-infrared heaters were divided into a preheating zone $Z_1$ of 1120 mm length and a shrink zone $Z_2$ of 1880 mm length. The length $l_1$ of each block B was set to 720 mm, while the distance $l_2$ between adjacent blocks B was set to 40 mm. In this example, the variations of the entire height of an article (having an entire length of 150 mm before treatment) resulted from the shrinkage thereof, depend on the material, shape, density and the like of the article, but generally proceed as shown in FIG. 4. In the shrink zone $Z_2$, the far-infrared heaters in the blocks B concerned are lowered in parallel to the heaters in the preheating zone $Z_1$, to the positions shown by alternate long and two short dashes lines such that the distance d is maintained constant at each of the upstream-side ends (the left-side ends in FIG. 4) of the blocks B. In the area shown by the alternate long and two short dashes lines, the distance d between the article and the heaters at the upstream-side ends of the blocks B was set to about 30 mm. At this time, the distance between the article and the heaters at the downstream-side ends of the blocks B was about 76 mm. That is, the distance between the heaters and the article was set in a range from 30 mm to 76 mm (or 53 ±23 mm) in this example. Alternatively, the heaters may be inclined so as to follow the variations of the entire height of the article A.

As to the furnace 10, the walls are preferably made of an aluminium plate because aluminium has a good reflection factor of far infrared rays. To further improve the reflection factor, reflectors may be disposed along the lateral sides of the belt conveyor 20 (These reflectors will be hereinafter referred to as the lateral reflectors). In particular, these lateral reflectors are preferably curved such that the upper and lower portions thereof come near to the article, thereby to further improve the reflection efficiency.

To make sure of the foregoing, tests were conducted with the use of flat and curved lateral reflectors, respectively. That is, ten tests were conducted for each of predetermined conveyor speeds. In these tests, the far-infrared heaters in two blocks B at the downstream side in FIG. 4 were lowered to positions which are lower than the positions shown by the alternate long and two short dashes lines in FIG. 4. The test results are shown in Table 2, of which data are graphed in FIG. 5.

TABLE 2

| Shape* | Flat | | | Curved | | |
|---|---|---|---|---|---|---|
| Conveyor Speed (m/min) Shrinkage Factor Test No. | 1.13 | 1.37 | 1.60 | 1.13 | 1.60 | 2.10 |
| 1 | 95.2% | 95.1% | 93.5% | 96.1% | 95.1% | 85.2% |
| 2 | 95.2 | 94.8 | 93.6 | 96.2 | 94.3 | 84.4 |
| 3 | 95.6 | 95.2 | 93.3 | 96.1 | 94.7 | 83.9 |
| 4 | 95.7 | 94.7 | 93.5 | 96.2 | 94.5 | 84.0 |
| 5 | 95.8 | 94.9 | 92.1 | 96.5 | 94.3 | 83.1 |
| 6 | 95.8 | 94.5 | 92.5 | 96.0 | 93.9 | 83.4 |
| 7 | 95.5 | 94.4 | 92.6 | 96.4 | 92.8 | 82.5 |
| 8 | 95.7 | 94.3 | 91.9 | 95.9 | 93.5 | 83.3 |
| 9 | 95.8 | 93.9 | 90.7 | 96.3 | 93.1 | 82.4 |
| 10 | 95.8 | 94.5 | 90.4 | 96.0 | 93.9 | 83.6 |
| Average | 95.6 | 94.6 | 92.2 | 96.2 | 94.0 | 83.5 |

*Shape of the lateral reflectors

Figure 5:
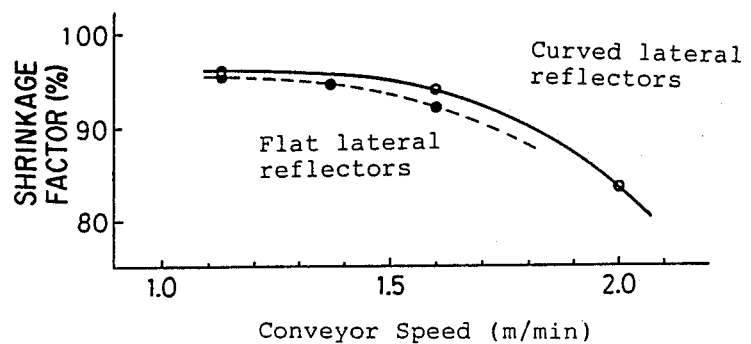
FIG. 5 is a graph showing a relationship between the shrinkage factor of an article and the shapes of lateral reflectors.

It is apparent from Table 2 and FIG. 5 that the shrinkage factor is improved by incurvating the surfaces of the lateral reflectors. Accordingly, the incurvation of the lateral reflectors makes it possible to increase the conveyor speed, thereby to improve the treatment capacity. It is preferable to incurvate the lateral reflectors such that the far-infrared rays reflected are concentrated on the article as much as possible. In such a case, it is preferable that the heights of the lateral reflectors are automatically adjustable such that articles having a variety of heights can be treated.

As to the article A, not only the molded articles of expanded polystyrene but also molded articles of other thermoplastic expanded resin may be treated. In particular, when treating an article A having a great entire height value, cutting means may be disposed upstream of the furnace 10 for cutting such a high article A into pieces having a height suitable to be treated. The cutting means may be a cutter having a Nichrome wire heater.

The second far-infrared heaters 31 under the conveying-side belt 23a are useful for further improving the shrinkage factor of the article A. To clarify the foregoing, tests were conducted with and without the use of the second far-infrared heaters 31. It is noted that a reflector was disposed under the conveying-side belt 23a when the second far-infrared heaters 31 were not used. Ten tests were conducted for each of predetermined conveyor speeds. In these tests, the far-infrared heaters in two blocks B at the downstream side in FIG. 4 were lowered to positions which are lower than the positions shown by the alternate long and two short dashes lines, likewise the previous tests.

Figure 6:
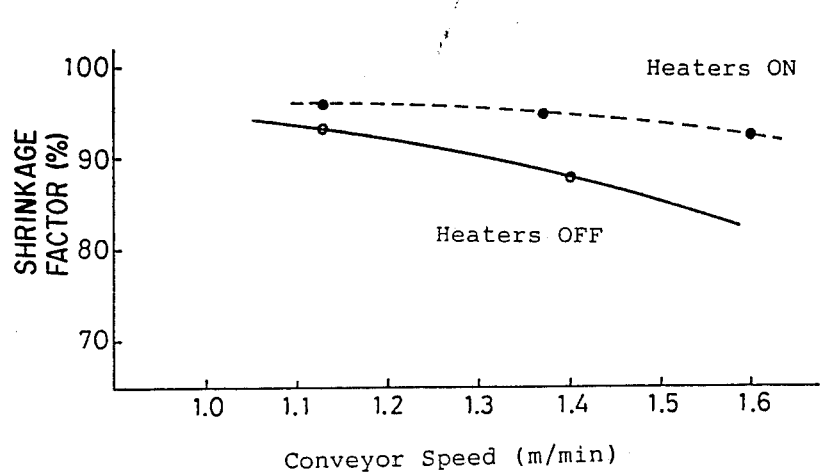
FIG. 6 is a graph showing a relationship between the shrinkage factor of an article and the presence/absence of second far-infrared heaters for heating articles from the bottoms thereof.

The test results are shown in Table 3, of which data are graphed in FIG. 6.

TABLE 3

| Heater Condition Conveyor Speed (m/min) Shrinkage Factor Test No. | Heaters ON | | | Heaters OFF | |
|---|---|---|---|---|---|
| | 1.13 | 1.37 | 1.60 | 1.13 | 1.40 |
| 1 | 95.2% | 95.1% | 93.5% | 93.7 | 89.6 |
| 2 | 95.2 | 94.8 | 93.6 | 93.5 | 88.6 |
| 3 | 95.6 | 95.2 | 93.3 | 93.7 | 89.6 |
| 4 | 95.7 | 94.7 | 93.5 | 93.9 | 88.8 |
| 5 | 95.8 | 94.9 | 92.1 | 92.6 | 88.4 |
| 6 | 95.8 | 94.5 | 92.5 | 92.6 | 86.2 |
| 7 | 95.5 | 94.4 | 92.6 | 91.8 | 86.5 |
| 8 | 95.7 | 94.3 | 91.9 | 92.4 | 86.0 |
| 9 | 95.8 | 93.9 | 90.7 | 92.3 | 85.6 |
| 10 | 95.8 | 94.5 | 90.4 | 92.9 | 86.8 |
| Average | 95.6 | 94.6 | 92.2 | 92.9 | 87.6 |

It is apparent from Table 3 and FIG. 6 that the shrinkage factors obtained without the use of the second far-infrared heaters 31 are lower than those obtained with the use of the far-infrared heaters 31. In particular, it is apparent from FIG. 6 that the shrinkage factor is lowered by about 3% for the conveyor speed of 1.13 m/min., about 15% for the conveyor speed of 1.4 m/min. and about 20% for the conveyor speed of 1.6 m/min. Accordingly, the provision of the second far-infrared heaters 31 is preferable.

The conveyor belt 23 of the belt conveyor 20 may be a belt whose at least portion coming in contact with the article A is coated with fluororesin. The use of such a conveyor belt reduces the likelihood that the shrunk article A' sticks to the conveyor belt 23. The conveyor belt 23 may be made of fluororesin instead of a metallic net. The conveyor belt 23 also may be a belt whose at least portion coming in contact with the article A is coated with fluororesin or may be a belt made of rubber. The use of such conveyor belts also reduces the likelihood that the shrunk article A' sticks to the conveyor belt 23. As to the above-mentioned conveyor belt 23 made of fluororesin, a belt made of polytetrafluoroethylene reinforced by glass fibers is preferable since it assures a good durability of the conveyor belt 23.

The above-mentioned conveyor belt at least a portion of which is made of fluororesin may be netted or non-netted, but a netted belt is preferable since it prevents small pieces of the shrunk article A' from falling off from the conveyor belt 23, thereby assuring reliable collection of the article. The use of the conveyor belt 23 which is non-netted makes it useless to dispose the second far-infrared heaters 31 and the reflector 50 under the conveying-side belt 23a as in the embodiments above-mentioned. It is therefore desirable to dispose third far-infrared heaters 32 along the lateral sides of the conveyor belt 23 (See FIG. 7). The joint use of the third far-infrared heaters 32 not only achieves efficient treatment of the article A, but also eliminates so precise setting of the distance d between the second far-infrared heaters 31 and the article A. This presents the advantage of practical convenience.

Figure 7:
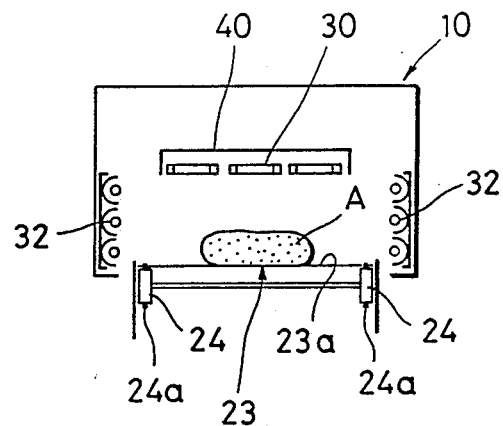
FIG. 7 is a section view of portions of a third embodiment of the present invention.

In the embodiment above-mentioned, it is desirable, as shown in FIG. 7, that the conveyor belt 23 is wound on pulleys 24 provided on the outer peripheries thereof with pins 24a, and the conveyor belt 23 is provided in both lateral sides thereof with holes at predetermined space intervals into which the pins 24a are adapted to be inserted. Such arrangements prevent the conveyor belt 23 from presenting a sidemovement and getting out of the pulleys 24 which would be otherwise caused by uneven stretch of the conveyor belt 23 due to heating.

Figure 8:
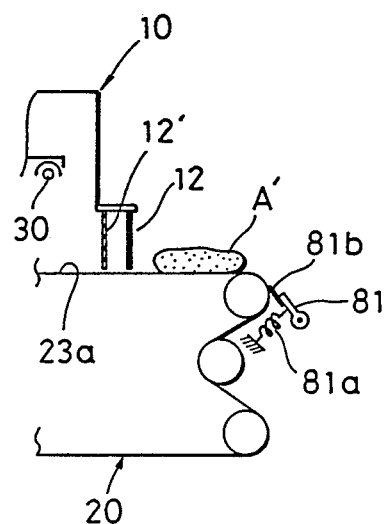
FIGS. 8 and 9 are schematic views of portions of fourth and fifth embodiments of the present invention, respectively.

In any of the embodiments above-mentioned, it is desirable to dispose, at the end portion of the conveyor belt 23, a scraper 81 for scraping off the shrunk article A' from the conveyor belt 23 (See FIG. 8). If the shrunk article A' is melted and sticks to the conveyor belt 23, the scraper 81 forcibly scrapes off such molten portions from the conveyor belt 23. Preferably, the scraper 81 resiliently comes in contact with the conveyor belt 23 by a spring 81a or the like. The tip portion of the scraper 81 which comes in contact with the conveyor belt 23 is preferably formed by a thin plate 81b, thereby to assure reliable scrape of molten portions of the shrunk article A' from the conveyor belt 23.

Figure 9:
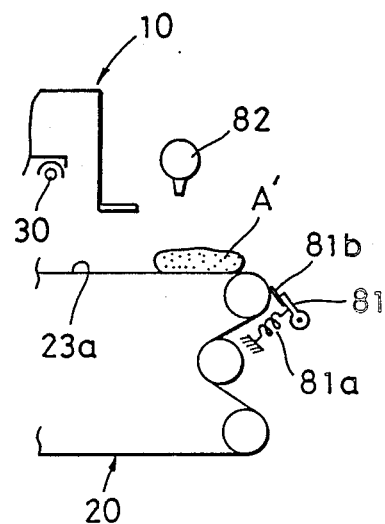

In accordance with the present invention, the shrinking apparatus may be provided in the vicinity of the furnace outlet 12 with air blow means 82 for blowing air against the shrunk article A' (See FIG. 9). In such an arrangement, the shrunk article A' is cooled and solidified by an air blow. This facilitates the removal of the article A' from the conveyor belt 23. Further, crushing the article A' is also facilitated when the article A' is to be crushed at a post-treatment step. The joint use of the air blow means 82 and the scraper 81 having the thin plate 81b which is resiliently pressed to the belt conveyor 20 achieves substantially perfect scrape of the shrunk article A' from the belt conveyor 23.

In accordance with the present invention, the shrinking apparatus may have a system in which the distance d between the first far-infrared heaters 30 and the article A is sensed by sensor means or the like and the heaters 30 are automatically moved in vertical directions so as to maintain the distance d in a proper range. The shrinking apparatus of the present invention is not limited to the above embodiments, but is modifiable without departing from the scope of the invention. For example, a bucket conveyor may be employed as conveying means.

According to the shrinking apparatus of the present invention, the distances between the far-infrared heaters and the conveying means are gradually reduced in a direction from the furnace inlet to the furnace outlet. This assures efficient irradiation of far infrared rays onto articles such as molded articles of expanded polystyrene of which entire height is lowered as the volume is reduced. This enables the articles to be successively reduced in bulk, assuring a ready and efficient reduction in volume of the articles.

In particular, when the conveying means is a belt conveyor whose at least surface coming in contact with the article is made of fluororesin, the shrunk article can be efficiently restrained from sticking to the conveyor belt. When the conveyor belt is made of polytetrafluoroethylene reinforced by glass fibers, a good durability of the conveyor belt can be achieved.

When far-infrared heaters are additionally disposed for heating articles from the lateral sides thereof, the articles can be heated more effieicntly to further improve the treatement capacity.

What we claim is:

1. A shrinking apparatus for heating and shrinking articles such as molded articles of thermoplastic expanded resin to reduce said articles in bulk, said shrinking apparatus comprising a furnace having an inlet and an outlet; conveying means extending through said furnace and including a belt conveyor; a plurality of far-infrared heaters in said furnace disposed at distances opposite said conveying means, the distances between said conveying means and the far-infrared heaters opposite thereto being gradually reduced in a direction from the furnace inlet to the furnace outlet; scraper means for scraping off shrunk articles from the belt conveyor, said scraper means coming into contact with an end portion of the belt conveyor; and air blowing means provided outside of said furnace in the vicinity of said outlet for blowing compressed air against the shrunk articles to cool and solidify the articles.

2. A shrinking apparatus according to claim 1, wherein the conveying means is disposed substantially at an equal level, and the far-infrared heaters are gradually lowered in level in a direction from the furnace inlet to the furnace outlet.

3. A shrinking apparatus according to claim 1, wherein the far-infrared heaters are disposed substantially at the same level, and the conveying means is gradually raised in level in a direction from the furnace inlet to the furnace outlet.

4. A shrinking apparatus according to claim 1, wherein the belt conveyor includes a conveyor belt having at least one surface coming in contact with said articles, said at least on surface being made of fluororesin.

5. A shrinking apparatus according to claim 4 wherein the conveyor belt is made of polytetrafluoroethylene reinforced by glass fibers.

6. A shrinking apparatus according to claim 4, wherein the conveyor belt is endlessly rotated as engaged with pins projecting from pulleys.

7. A shrinking apparatus according to claim 1, further comprising far-infrared heaters for heating articles from lateral sides thereof.

8. A shrinking apparatus according to claim 1, further comprising far-infrared heaters for heating articles from below.

9. A shrinking apparatus according to claim 1, wherein lateral reflectors are disposed along lateral sides of the conveying means for reflecting far-infrared rays from the far-infrared heaters onto the article.

10. A shrinking apparatus according to claim 9, wherein the far-infrared reflectors are curved.

* * * * *